United States Patent [19]

Van Zeeland

[11] Patent Number: 4,626,683
[45] Date of Patent: Dec. 2, 1986

[54] THROUGH-BEAM OPTICAL DETECTOR SYSTEM WITH ALIGNMENT AID

[75] Inventor: Donald L. Van Zeeland, Franklin, Wis.

[73] Assignee: Eaton Corporation, Cleveland, Ohio

[21] Appl. No.: 441,194

[22] Filed: Nov. 12, 1982

[51] Int. Cl.[4] ............................................. G01B 11/27
[52] U.S. Cl. .................................. 250/239; 250/221; 356/399
[58] Field of Search ............... 250/216, 221, 222, 239, 250/552; 340/556, 600; 356/141, 152, 399, 400, 153

[56] References Cited

U.S. PATENT DOCUMENTS 3,471,241 10/1969 Hendrixson et al. ................ 356/399
3,535,539 10/1970 Malespina et al. .................. 250/239
4,013,886 3/1977 Schmid ................................. 250/221
4,354,106 10/1982 Walter ............................. 250/221 X Primary Examiner—Edward P. Westin
Attorney, Agent, or Firm—Andrus, Sceales, Starke & Sawall

[57] ABSTRACT

A through-beam optical detector system using a universal dual port transmitter housing module is provided with an auxiliary light source in the available but unused port of the transmitter housing module for transmitting visible light to aid alignment of transmitter and receiver.

1 Claim, 3 Drawing Figures

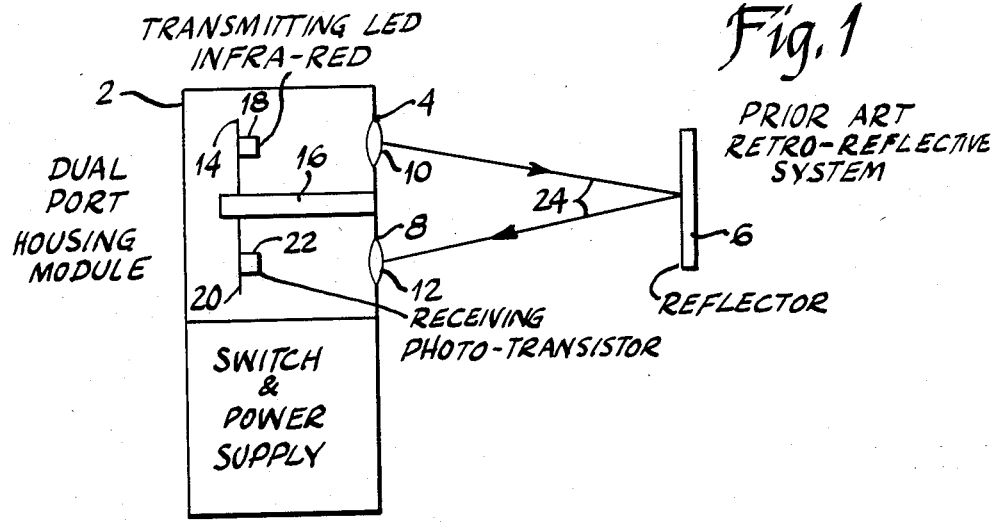
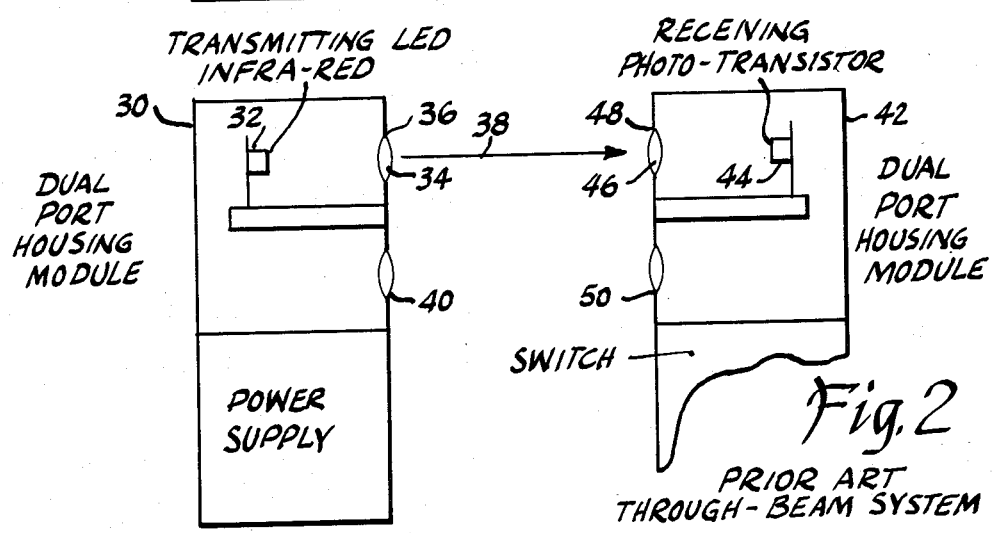
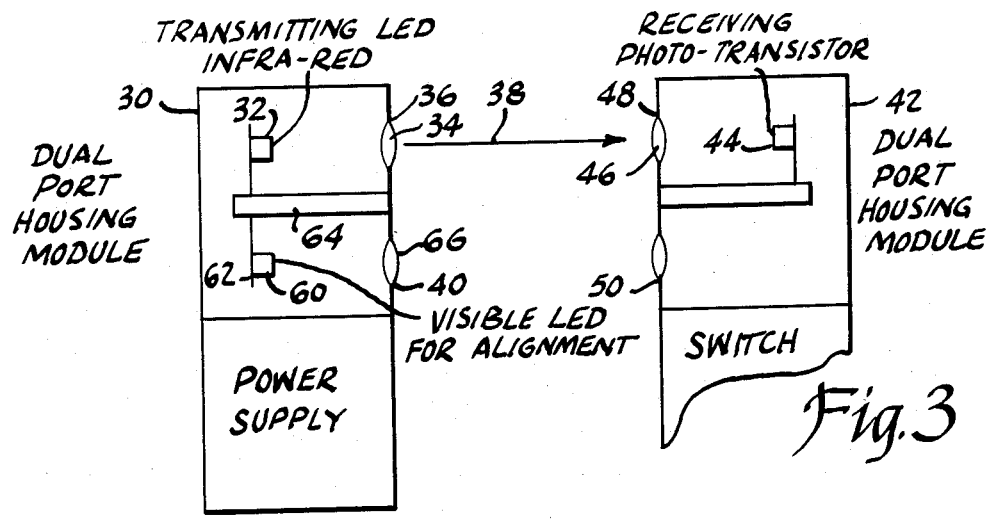

THROUGH-BEAM OPTICAL DETECTOR SYSTEM WITH ALIGNMENT AID

BACKGROUND AND SUMMARY

The invention relates to optical detector systems having a universal type dual port, dual lense, optic module usable in both through-beam and retroreflective systems.

In a retro-reflective system, FIG. 1, a transmitter module has two ports, each with a focusing lense. Infrared light or the like is emitted from one port towards a reflector, and received at the other port to complete an optical circuit and trigger the appropriate detection circuitry. An object moving through the optical path interrupts the circuit, which absence of light is detected at the receiving port and appropriately interpreted by the detection circuitry for performing a given function, such as closing or opening a switch, counting, verification, etc.

In a through-beam optical detector system, FIG. 2, the receiver is separate, and remotely spaced from the transmitter. Light emitted from the transmitter travels directly to the receiver, without reflection.

For cost efficiency, including tooling expense, the dual port optic housing module of the retro-reflective system is commonly used in the through-beam system. Only one port of the housing module is used for transmitting light, while the other port is an unused dummy. A second module, which may also be a dual port type, is used for housing the receiver. One port has the photo-receiving circuitry, while the other port is an unused dummy. This arrangement is known in the art, and enables universal use of the dual port optic housing module.

The present invention provides an improvement in the through-beam system. An auxiliary light source is provided in the available but unused port of the transmitter module for transmitting visible light to aid alignment of the transmitter and the receiver.

BRIEF DESCRIPTION OF THE DRAWINGS

FIG. 1 is a schematic illustration of a known retro-reflective optical detector system.

FIG. 2 is a schematic illustration of a known through-beam optical detector system.

FIG. 3 is a schematic illustration of a through-beam optical detector system constructed in accordance with the invention.

DESCRIPTION OF PRIOR ART

In the known retro-reflective optical detector system of FIG. 1, a dual port optic module 2 houses components which transmit light from one port 4 to a reflector 6, and receive the reflected light at a second port 8. Each port has a respective focusing lense 10 and 12. A printed circuit board 14 is mounted in housing module 2 on one side of a dividing wall 16 and has a transmitting LED 18 (light emitting diode) which emits infra-red light through lense 10 in port 4 for transmission to reflector 6. Infra-red is most common because of its high efficiency and power capability. Printed circuit board 20 is mounted in module 2 on the other side of dividing wall 16 and has a photo-transistor 22 for receiving the reflected light through lense 12 in port 8. Switching and power supply circuitry is usually mounted below module 2 for controlling the optical circuit, and providing the appropriate detection response when the optical beam between module 2 and reflector 6 is broken by an object therebetween interrupting optical path 24. A typical receiving system uses synchronous demodulation detection.

In the known through-beam optical detector system of FIG. 2, the receiver is separated and spaced at a remote location from the transmitter and receives light directly from the latter without reflection. To eliminate the need for designing a dedicated optic housing module for the transmitter and/or the receiver, the dual port housing module of FIG. 1 is commonly used in the through-beam system of FIG. 2. Dual port module 30 houses a transmitting infra-red LED 32 for emitting light through focusing lense 34 in port 36 for transmission along optical path 38. The other port 40 is an unused dummy. A dual port module 42 may also be used for housing a phototransistor 44 which receives the infra-red light along path 38 through lense 46 in port 48. The other port 50 is an unused dummy. A typical receiving system uses band-pass detection.

DESCRIPTION OF THE INVENTION

The present invention provides an improvement in the through-beam system of FIG. 2, and like reference numerals are used where appropriate to facilitate clarity. An auxiliary light source such as LED 60 is provided on a printed circuit board 62 mounted in transmitter housing module 30 on the bottom side of dividing wall 64, comparably to PC board 20 of FIG. 1. LED 60 is preferably chosen to emit visible light, which light is transmitted through lense 66 in the available but otherwise unused port 40 of FIG. 2. The transmitted visible light travels along a path which generally parallels infra-red path 38.

In a through-beam system, alignment of transmitter and receiver is critical within extremely precise tolerances. For example, receiver housing module 42 must be translated up or down, or in or out of the page, until the optical axis of lense 46 is precisely colinearly aligned with optical path 38. Alignment is made further difficult because the infra-red transmitted light is not visible, and thus it is difficult to narrow the radius of error to smaller and smaller circles around the optical axis. Light intensity decreases rapidly as one moves only slightly off axis.

The improvement in FIG. 3 facilitates alignment because one can see a spot of light from LED 60 either at a temporary target reflector or by placing one's eyeball in the general vicinity of the optical axis. This initial or pre-alignment is rough, and is then followed by a fine tuning alignment according to reception of the infra-red light along path 38 by photo-transistor 44 in receiver housing module 42. The initial rough alignment, however, saves time by narrowing the alignment area to a smaller region before beginning the more time consuming fine tuning alignment.

It is recognized that various modifications are possible within the scope of the appended claims.

I claim:

1. In optical detector systems having a universal type dual port transmitter housing module usable in both retro-reflective and through-beam optical detector systems, the retro-reflective system using both ports of the transmitter housing module, one port for transmitting, and the other port for receiving, the through-beam system using one port of the transmitter housing module for transmitting, and using a separate remotely spaced receiver for receiving, the improvement in a through-beam system comprising:

an auxiliary light source in the available but unused port of the transmitter housing module to aid alignment of transmitter and receiver, wherein the receiver is housed in a universal type dual port module, and said auxiliary light source of the available but unused port of the transmitter shines on the available but unused port of the receiver for alignment purposes.

* * * * *